(12) United States Patent
Xie et al.

(10) Patent No.: US 7,797,450 B2
(45) Date of Patent: Sep. 14, 2010

(54) TECHNIQUES FOR MANAGING INTERACTION OF WEB SERVICES AND APPLICATIONS

(75) Inventors: Nan Xie, San Mateo, CA (US); Vebhhav Singh, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1038 days.

(21) Appl. No.: 10/648,951

(22) Filed: Aug. 26, 2003

(65) Prior Publication Data
US 2004/0068586 A1    Apr. 8, 2004

Related U.S. Application Data

(60) Provisional application No. 60/416,040, filed on Oct. 4, 2002.

(51) Int. Cl.
*G06F 15/16* (2006.01)
(52) U.S. Cl. .................................................... 709/246
(58) Field of Classification Search ................ 709/346, 709/246, 217
See application file for complete search history.

(56) References Cited

U.S. PATENT DOCUMENTS

| | | | |
|---|---|---|---|
| 6,334,114 B1 | 12/2001 | Jacobs et al. | |
| 6,961,760 B2 * | 11/2005 | Li et al. | 709/219 |
| 2002/0156685 A1 * | 10/2002 | Ehrlich et al. | 705/26 |
| 2004/0044729 A1 * | 3/2004 | Foerg et al. | 709/203 |
| 2005/0091386 A1 | 4/2005 | Kuno et al. | |
| 2006/0150026 A1 * | 7/2006 | Kolawa et al. | 714/38 |
| 2007/0233871 A1 * | 10/2007 | Fletcher et al. | 709/226 |

FOREIGN PATENT DOCUMENTS

WO    WO 00/56033 A1    9/2000

OTHER PUBLICATIONS

Kuassi Mensah, et al., Oracle Corporation, "Database Web Services," An Oracle White Paper, Nov. 2002, pp. 1-21.

* cited by examiner

*Primary Examiner*—Nathan Flynn
*Assistant Examiner*—Chirag R Patel
(74) *Attorney, Agent, or Firm*—Hickman Palermo Truong & Becker LLP; Adam C. Stone

(57) ABSTRACT

A web service broker transforms, at runtime, output data from client applications to the input data form required by various web services. Such transformations are based on data and/or parameter mappings that are accessible to the broker. Further, the broker accesses and invokes particular web services in the manner required by the web services. Such invocations are based on information regarding the access style, such as RPC style of communication, and encoding, such as SOAP, associated with respective web services. The broker provides a generic framework in that it is capable of supporting transformation of different data and data forms from many different applications to respective data that many different respective web services can use.

58 Claims, 6 Drawing Sheets

TECHNIQUES FOR MANAGING INTERACTION OF WEB SERVICES AND APPLICATIONS

CROSS REFERENCE TO RELATED APPLICATIONS

This application claims the benefit of domestic priority under 35 U.S.C. §119(e) from U.S. Provisional Patent Application No. 60/416,040 entitled "WebServices Broker," filed on Oct. 4, 2002, which is incorporated by reference in its entirety for all purposes, as if fully set forth herein.

FIELD OF THE INVENTION

The present invention relates generally to web services and, more specifically, to techniques for managing interaction between web services and applications that invoke web services.

BACKGROUND OF THE INVENTION

Services provided over the Internet, commonly referred to as web services or application services, are evolving. Likewise, technologies that facilitate such services are also evolving. A web service can be defined as any information source running business logic processes conveniently packaged for use by an application or end-user. Web services are increasingly becoming the means through which one can provide functionality over a network. Web services typically include some combination of programming and data that are made available from an application server for end users and other network-connected application programs. Web services range from such services as storage management and customer relationship management down to much more limited services such as the furnishing of a stock quote and the checking of bids for an auction item.

Activities focusing on defining and standardizing the use of web services include the development of Web Services Description Language (WSDL). WSDL is an Extensible Markup Language (XML) format for describing web services as a set of endpoints operating on messages containing either document-oriented or procedure-oriented information. The operations and messages are described abstractly, and then bound to a concrete network protocol and message format to define an endpoint. Related concrete endpoints are combined into abstract endpoints (services).

Currently, the advocated web service usage model is generally as follows.

(1) Services are implemented and deployed on one site, often referred to as the server side.

(2) Services are described using WSDL and are published via means such as UDDI (Universal Description, Discovery, and Integration), which is an XML-based registry for businesses worldwide to list themselves on the Internet by the web services they offer.

(3) Client applications use web services at another site, often referred to as the client side, by first interpreting one or more WSDL documents. Once interpreted, the clients can understand the characteristics of the associated service(s). For example, service characteristics may include service API specifications such as (a) input data type, (b) service input data format, (c) service access mechanism or style (e.g., RPC versus messaging), and (d) related encoding format.

(4) Client applications prepare their data in manners in which various particular web services understand.

(5) Client applications invoke a particular service according to the manner specified for the service, such as in an associated WSDL document.

Many differences exist among web services with respect to the format of input data and the manner in which they are invoked. For example, suppose one application service provider provides a service, getStockQuote, that requires a single input parameter, such as a conventional stock symbol (e.g., ORCL for Oracle Corp.). A client application that intends to invoke such a service needs to be written so that data within or output by the application is able to be analyzed to extract the stock symbol information. At runtime, the prepared symbol is passed to the getStockQuote service site using appropriate APIs.

However, suppose another application service provider provides a similar service that requires two input parameters, such as the stock symbol and the time of request. Hence, if a client application intends to invoke this second service, it needs to analyze and extract its data appropriately in regards to the required service input parameters. Therefore, if a single application was intended to invoke both services, the application would have to be hard-coded with service-specific API information and procedures. Furthermore, if the application was intended to invoke numerous services, the application would have to be hard-coded with service-specific API information and procedures related to each and every service that it intended to invoke.

As explained above, various web services may provide similar functionality but differ in many ways. Currently, in order to accommodate these differences, client applications need to be specifically designed for each one of the web services based on the anticipated usage of the application and related web services.

Based on the foregoing, there is a need for a generic framework for managing interaction between web services and applications that invoke web services.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
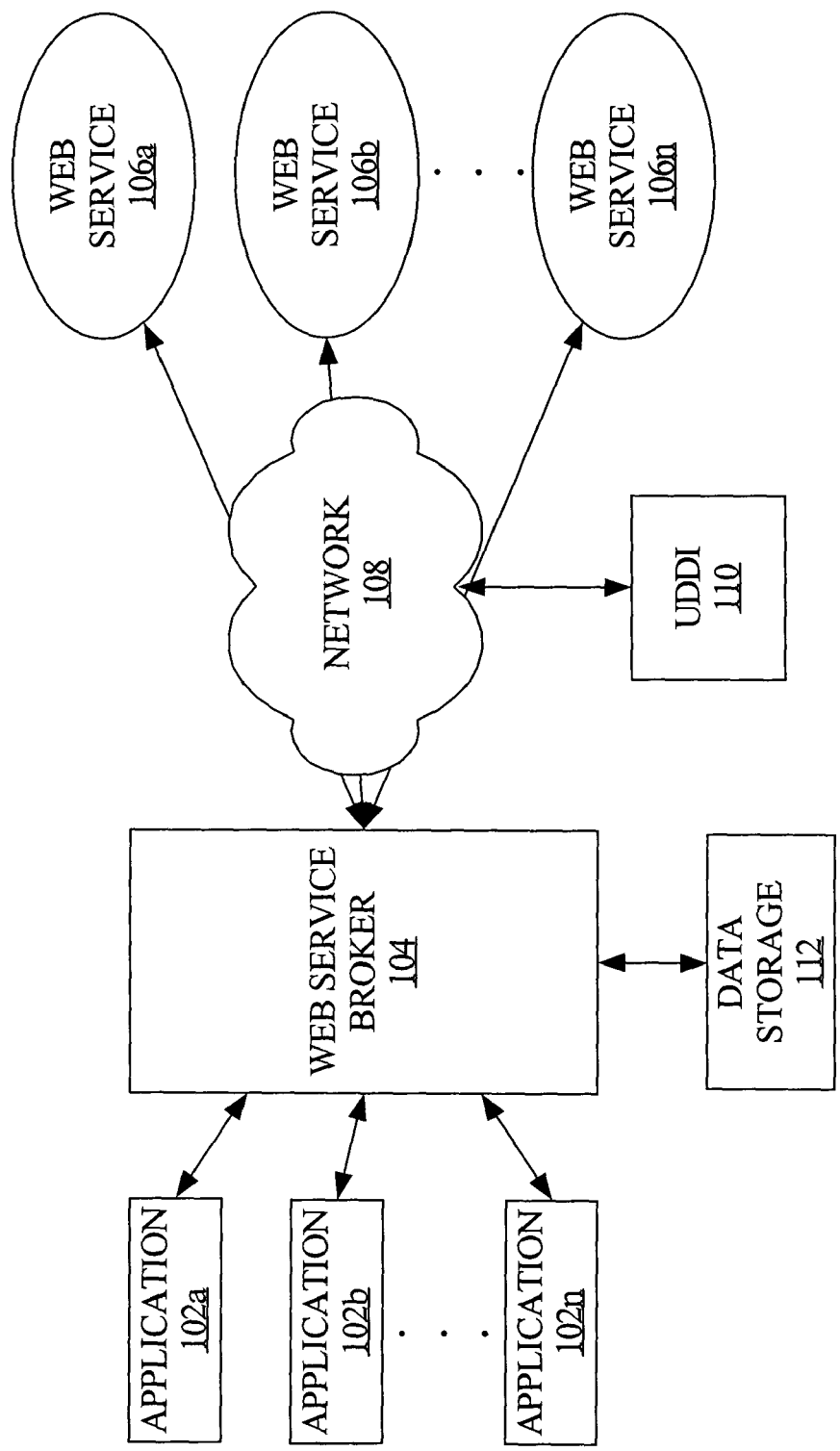
FIG. 1 is a block diagram that illustrates an operating environment in which embodiments of the invention may be implemented.

Techniques are described for managing interaction between web services and applications that invoke web services. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Web Service Broker Overview

Techniques are described in which a "web service broker" functions to isolate client applications from web services that the applications invoke. Hence, client applications can be developed more generically, without being written specifically to invoke a particular web service.

A web service broker ("broker") transforms, at runtime, client output data to the data content and form required by various web services. Such transformations are based on data and/or parameter mappings that are accessible to the broker. Further, the broker accesses and invokes particular web services in the manner required by the web services. For example, web services may be invoked via a message style or a remote procedure call (RPC), using a specific data input format, and using a specific encapsulation format (referred to as "encoding"), such as SOAP (Simple Object Access Protocol). Such invocations are based on access style and encoding information that are accessible to the broker. The transformation and invocation information are typically developed near the time of deployment of a particular client application, at which time the available web services are known. Furthermore, at this time the particular customer or user of the application instance may be known, as well as the customer's preferences regarding use of particular web services.

The broker provides a generic framework because it is capable of supporting transformation of different data and data forms from many different applications to respective data that many different respective web services can use. The broker is able to facilitate multiple requests for information from a particular application, where some of the requests are eventually passed to different web services, even in situations where the different web services are associated with different data and invocation requirements. Furthermore, the broker is able to facilitate web service requests from applications with different data content and data structures.

In an embodiment, a request for information from a particular web service is received from a source. For example, a broker receives from an application some form of call or request for information that is provided by a web service. The application-broker interaction may be synchronous or asynchronous. The web service has characteristics that are described in WSDL and published in a UDDI registry. In response to receiving the request, the broker accesses transformation information that specifies how to transform data associated with the request, such as data from the client application, to data that a web service can use to service requests. Thus, the broker can determine the proper data, data format, access style and encoding manner in which to formulate a request to the particular web service desired by the application user. Then, based on the transformation information, the data from the client application is transformed to the proper data and format requirements of the particular web service, and passed to the particular web service according to access style and encoding requirements of the particular web service.

In an embodiment, a request for information that includes identification of the particular instance of a source is received from the source. Based on the identification of the particular instance, the broker can identify the user's web service preferences. In response to receiving the request, the broker accesses transformation information that includes a mapping between the particular instance of the source and a particular web service from which the particular instance wants the requested information. Based on the transformation information, the data from the client application is transformed to the proper data and format requirements of the particular web service, and passed to the particular web service according to access style and encoding requirements of the particular web service.

In an embodiment, a hint regarding the identification of the particular instance of the source is provided by the source to the broker. For example, a client application may pass "stock_quote" to the broker, which, via an algorithm, can resolve the particular desired web service from the hint.

In an embodiment, the broker accesses the transformation information to transform the results from the invoked web service to a proper data form and format that the requesting application can use. Hence, the broker can transform data from the calling application to data that particular web services can use, and transform data returned by the web service, e.g., the requested data.

Operation Environment

FIG. 1 is a block diagram that illustrates an operating environment in which embodiments of the invention may be implemented. The illustrated operating environment includes applications 102a, 102b-102n, which communicate through a web service broker ("broker") 104 to any of multiple web services 106a, 106b-106n via a network 108.

Applications 102a, 102b-102n are client software applications that each include one or more sequences of instructions that are executable by one or more processors. For example, applications 102a, 102b-102n are programs that are executable on a computer system such as the system illustrated in FIG. 6. There is no necessary relationship or similarity between applications 102a, 102b-102n, unless otherwise described herein. Each of the applications 102a, 102b-102n is capable of outputting requests for information with associated data which, in some form, can serve as input data to a web service 106a, 106b-106n. Such requests can be service-generic in that a particular web service is not specified, or can specifically identify a particular web service to service a particular request.

Web services 106a, 106b-106n typically include some combination of programming and data that are made available from a web server or application server for end users and other network-connected application programs. There is no necessary relationship or similarity between web services 106a, 106b-106n, unless otherwise described herein. Each of the web services 106a, 106b-106n is capable of receiving requests for information and receiving associated data which in some form serves as input data to the service that a given web service provides.

Web services 106a, 106b-106n typically require specific input data or information to be able to service requests, which may vary for different information requests and from web service to web service, and may even vary among different web services that provide the same service or information. For example, with two independent web services that provide current stock prices, one may require the stock symbol as input data whereas the other may require the stock symbol and the time of the request. Web services, such as web services 106a, 106b-106n, can have characteristics that are described in WSDL and that are published in UDDI 110. Web Services Description Language (WSDL) 1.1 is available from the WC3 (World Wide Web Consortium) and UDDI Version 3.0 is available as an OASIS (Organization for the Advancement of Structured Information Standards) Committee Specification from the UDDI.org organization, both of which are incorporated by reference in their entirety for all purposes as if fully disclosed herein.

Applications 102a, 102b-102n and web services 106a, 106b-106n are able to communicate through a communications network 108. Network 108 may contain any number of network infrastructure elements including routers, switches, gateways, etc. For example, network 108 may be the public Internet or a private LAN. In one embodiment, the network is a TCP/IP network in which infrastructure elements execute a conventional routing protocol for routing packets among the infrastructure elements. Although embodiments are described herein with reference to the TCP/IP protocols, implementations are not limited to use of TCP/IP. Rather, other network communication protocols, including protocols that are not yet developed, may be used to implement these techniques.

Web Service Broker

Broker 104 operates or executes to provide the techniques for managing web interaction between applications and web services, e.g., requests for web services, as described herein. Broker 104 includes one or more software modules that each include one or more sequences of instructions that are executable by one or more processors. For example, broker 104 is a program that is executable on a computer system such as the system illustrated in FIG. 6. Broker 104 may be configured as integral to an invoking application, such as applications 102a, 102b-102n, or as a separate program independent of any invoking application. Broker 104 may be configured on the client-side of the network or on the server-side of the network. For example, broker 104 can be configured as a plug-in module to a client application or on an application server.

The general functionality provided by broker 104 is (1) transformation of data output by a client application to a form of data that a web service can use as input data to service requests, and (2) invocation of a web service in a manner and format that is required by a given web service. The functions and capabilities of the broker 104 are described in more detail throughout this description.

The operating environment also includes a non-volatile data storage 112 for storing various information used by broker 104 in managing the interactions between applications 102a, 102b-102n and web services 106a, 106b-106n. For example, data storage 112 may be a conventional database storing transformation information 202 (FIG. 2) and providing access thereto to broker 104.

Each application 102a, 102b-102n can communicate with broker 104 independently of the other applications. Furthermore, execution of functionality of broker 104 may be transparent to users of the client applications and to the web services 106a, 106b-106n.

Transformation Information

Figure 2:
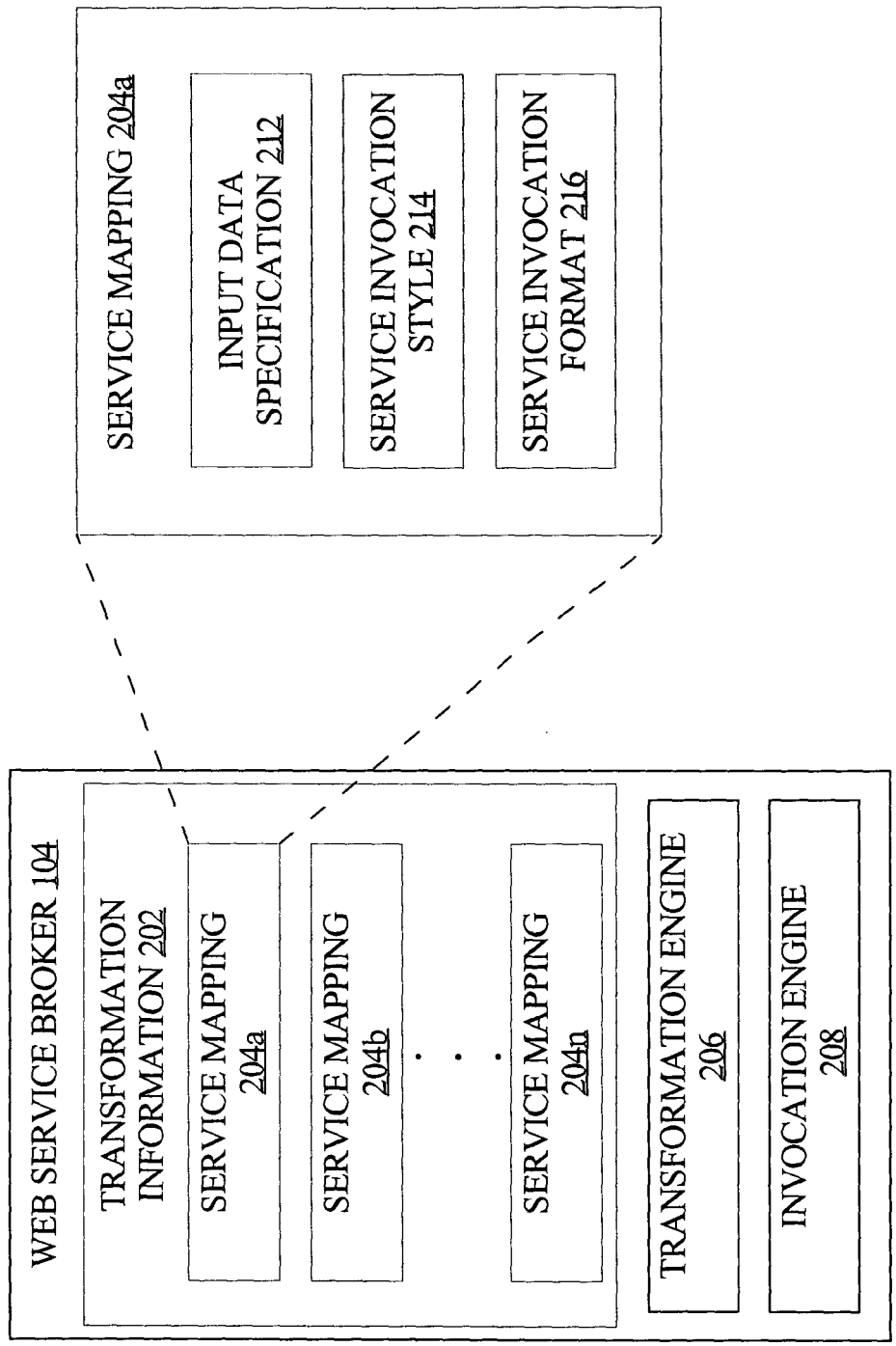
FIG. 2 is a block diagram that illustrates transformation information used by a web service broker.

FIG. 2 is a block diagram that illustrates transformation information used by a web service broker, such as web service broker 104, according to an embodiment of the invention. A broker 104 accesses and retrieves transformation information 202 from data storage 112 and, therefore, at times includes transformation information 202 in local volatile memory, such as Java Virtual Memory in RAM. Broker 104 includes a transformation engine 206 for transforming data from a requesting client application to input data that a web service can use to process requests. Broker 104 further includes an invocation engine 208 for invoking a web service according to a specific access style and data format that a web service can use to process requests.

The transformation information 202 is based on web service information recorded as "profiles" of respective web services. The web service profiles may be obtained, for example, during design, development or deployment of an invoking client application, with reference to a WSDL description of a particular web service published in UDDI. Profiles are typically constructed by a party affiliated with a developer of an invoking application, and stored in a repository, such as data storage 112, which is accessible by broker 104. As described further below, an incoming request from a requesting application is a typical event that triggers the broker 104 to access and interpret transformation information 202.

Service Mappings

Transformation information 202 includes one or more service mappings 204a, 204b-204n. Generally, service mappings 204a, 204b-204n "map" application information to web service information. Service mappings 204a, 204b-204n describe relationships between application data and web service data and invocation requirements and, generally, rules or directions for generating web services input requests from application output data. For example, rules may be associated with the transformation of application-proprietary objects or XML representations of proprietary objects to web service-specific objects, XML representations of service-specific objects or service-specific document formats. In addition to rules regarding how to transform data, in one embodiment, service mappings 204a, 204b-204n include program code to perform the necessary transformation. For example, code may be provided to retrieve and transform a database data model from persistent storage to an XML representation.

Based on information provided in a request from an application 102a, 102b-102n, broker 104 uses transformation information 202 to make determinations regarding (a) the transformation of data from a respective application to data that a particular web service can use, and (b) the invocation of the particular web service. The form and data container structure in which transformation information 202 is stored in data storage 112 is a detail that may vary from implementation to implementation. For non-limiting examples, transformation information 202 may be stored in one or more relational data tables, in one or more object-oriented programming objects (e.g., Java objects), or in one or more files.

Although illustrated in FIG. 2 as separate entities, service mappings 204a, 204b-204n may be implemented as one global mapping that includes information about all of the applications 102a, 102b-102n which an instance of broker 104 serves and the associated web services that may be invoked by such applications. Furthermore, service mappings may be implemented as one mapping per application or one mapping per web service. The configuration of transformation information 202 and of service mappings 204a, 204b-204n may vary from implementation to implementation and may depend on the nature of data storage 112 and the overall schema and structure of the information.

Each service mapping 204a, 204b-204n includes information regarding input data specification 212, service invocation style 214 and service invocation format 216.

Different web services require different input data content. For example, one stock quote service may require a stock symbol whereas another such service may require a stock symbol and a timestamp. Further, different web services require different input data forms or formats. For example, a web service may require input data in an XML document, according to and with a specific document type definition (DTD) and another web service may require Java objects.

Input data specification 212 includes information that maps client application data to a data form required by one or more particular web services. In the context of the stock price example, in a request for information or a call to a web service, one client application may output data including a stock symbol in a proprietary format and another client application may output data including a timestamp and a stock symbol in a standard format or, perhaps, multiple client applications output the same data in the same format.

Input data specification 212 includes information that specifies or describes how to transform the data output by a particular requesting application to the appropriate input data and format for a requested web service. Transformation engine 206 of web service broker 104 uses input data specification 212 to transform data output by a client application via a request to data that can be used to invoke a particular web service to service the request.

For example, in a request for a stock quote, application A may output parameters that include "stock=Oracle Corporation" and a stock quote web service may require input parameters in a format such as "co:XXXXX" and "time:00:00 PST". Transformation engine 206 uses information from input specification 212 to transform the application output to a suitable web service input. Some level of transformation information 202, such as service mapping 204n or input data specification 212 (FIG. 2), may include directions, routines, calls or the like, to transform specifically formatted application data to specifically formatted web service input data. Generally, if certain information is needed to invoke a web service and that information is not provided by the invoking application, transformation information 202 includes a road map as to how to obtain or derive the necessary information. In addition, if broker 104 fails to obtain or derive the transformation information 202, a mechanism to inform the source application of such a failure is incorporated within broker 104.

For example, service mapping 204a may include a routine, or a reference thereto, that looks up the stock identifier associated with "Oracle Corporation" for the relevant stock exchange. The transformation engine 206 calls the referenced routine to facilitate conversion of "Oracle Corporation" to "ORCL" and packages the data according to the format specified for the particular web service. Such a transformation routine may be stored as part of transformation information 202 or may be stored remotely and independently of transformation information and simply accessed or called by the transformation engine 206. Such a routine may even be in the form of a web service that the transformation engine 202 knows how to invoke. In addition, service mapping 204a, for example, may include a routine for establishing a timestamp according to the time zone and format required by the particular web service by referencing, for example, a system clock at the time of the transformation.

Not only do different web services require different input data, but different web services also specify different access styles that are used to invoke respective services. In other words, a "first manner" in which a web service can be invoked to service requests for particular information is specified. For example, some web services may specify that invocation of the service be according to the RPC style of communication, whereas some web services may specify that invocation of the service be according to a messaging style of communication. Furthermore, some web services may require or prefer dynamic RPC or stub RPC and some web services may require blocking, synchronous or asynchronous messaging. Regardless, service invocation style 214 includes information that specifies or describes the appropriate invocation style required by one or more particular web services. For example, service invocation style 214 may include directions and/or code as to how to generate and/or load an appropriate stub, how to prepare calling parameters and classes, and the like.

Furthermore, different web services may require input data to be encoded in different ways or according to different protocols. In other words, the data provided to a web service in a service request needs to be in a format, or a "second manner", that the web service can understand and use in servicing the request. For example, a web service may require that data in invocation requests be encoded according to the SOAP. Furthermore, a web service may require that parameters are identified in a specific manner. For example, one web service may require that the term "company" be abbreviated as "co" whereas another web service may require the term not be abbreviated. Regardless, service invocation format 216 includes information that specifies or describes the appropriate required format for invocation of one or more particular web services.

Invocation engine 208 of web service broker 104 uses service invocation style 214 and service invocation format 216 to package the transformed data in a manner consistent with the invocation requirements of a particular web service. In other words, the transformed data is packaged and passed to a particular web service in the "second manner" (e.g., SOAP-encoded) in association with the "first manner" (e.g., in an RPC). In addition, transformation information 202 includes information as to what data and in what format particular requesting applications require or prefer results from web services. Such information is used by transformation engine 206 to transform results from a web service into a format needed by a requesting application. Hence, transformation information 202 provides a two-way mapping of data, format and encoding requirements between applications that request information from web services and the web services from which the information is requested.

The web service information recorded as input data specification 212, service invocation style 214 and service invocation format 216 associated with a particular web service is collectively referred to as the "profile" of the web service. This profile may be obtained, for example, during design, development or deployment of an invoking client application, with reference to a WSDL description of a particular web service published in UDDI. In addition to WSDL-based information, a profile may include other information, such as authorized user names and associated passwords.

The profiles of many different web services may be captured and stored as service mappings, such as service mappings 204a, 204b-204n, in a repository, such as data storage 112 (FIG. 1), for access and use at runtime by the transformation engine 206 and the invocation engine 208 of broker 104. Additionally, the data parameters associated with particular client applications, for example, the nature and form of data output by or available from applications, is captured and stored as part of the transformation information 202.

The application data-capturing and profile-capturing activities may be performed by a consultant, for example, thereby isolating application developers from the external services and allowing developers to concentrate on the generic business logic embodied in a given application. The capturing activities may be based on preferences or requirements specified by a user of a particular instance or installment of a client application, because users may have a preference for one web service over another web service that provides the same information or service. A suitable software program that is capable of understanding web service and application data descriptions could perform the capturing activities. The manner in which information is captured from applications and web services may vary from implementation to implementation.

Process for Handling Requests for Web Services

A. Requests for Specific Web Services

Figure 3:
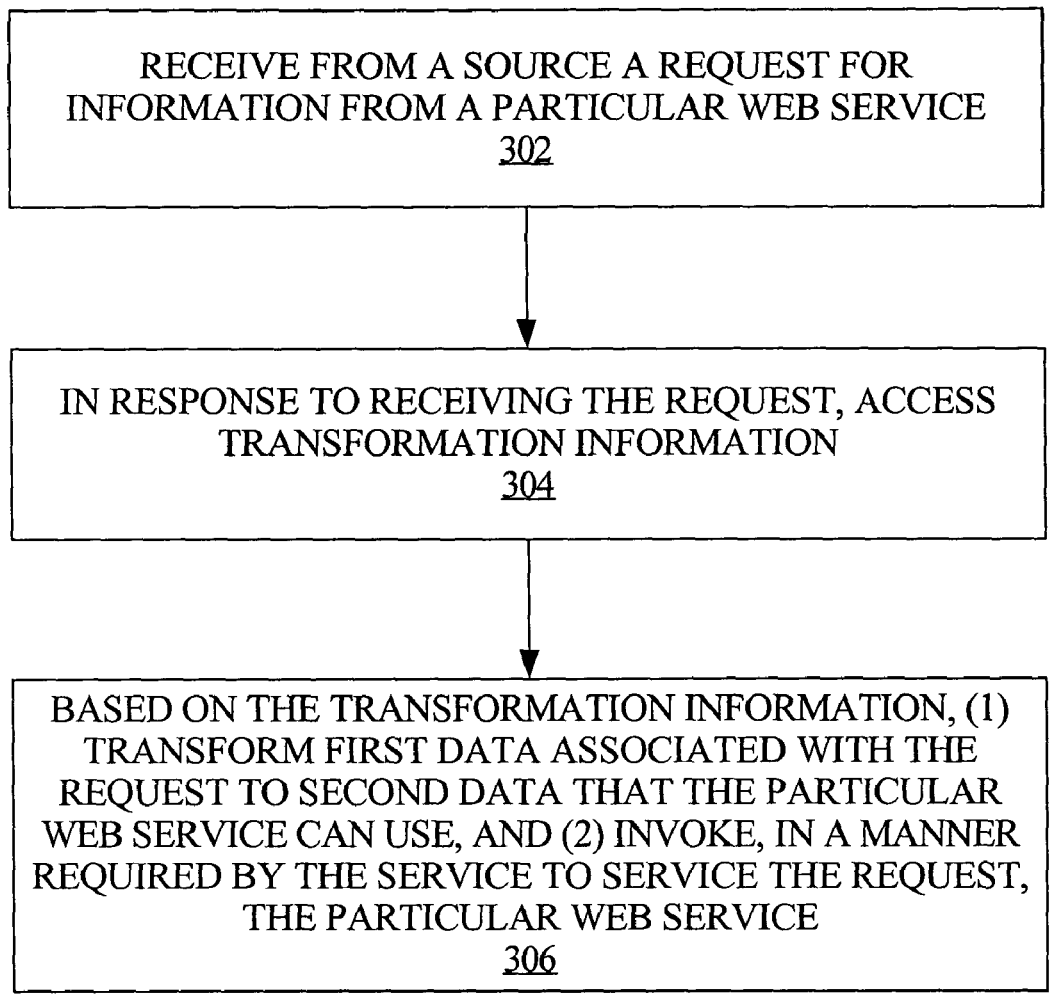
FIG. 3 is a flow diagram that illustrates an automated process for managing requests for web services.

FIG. 3 is a flow diagram that illustrates an automated process for handling requests for web services. The computer-implemented actions associated with the process of FIG. 3 are executed by one or more processors of a computer system, such as computer system 600 of FIG. 6. The instructions that are executed by the processor(s) are part of a computer program, such as the web service broker 104 of FIG. 2.

At block 302, a request for information is received from a source. The request is for information from a particular web service, which has characteristics that are described in WSDL and are published in a UDDI registry. For example, broker 104 receives a call-out from application 102*a* requesting certain information from web service 106*a*. With this aspect, the calling application, or an instance or installation thereof, may have been developed specifically for a particular user or may be generic for all users, with respect to the services that it can invoke. Thus, the call-out includes identification of the particular web service from which the requested information is desired.

At block 304, in response to the broker 104 receiving the request, transformation information is accessed. The transformation information, such as transformation information 202 (FIG. 2), specifies how to transform first data associated with the request to second data that the particular web service can use to service the request. For example, broker 104 reads and interprets transformation rules or mappings from input data specification 212 of service mapping 204*a*. The transformation information further specifies how to invoke the particular web service in a manner required by the web service. For example, broker 104 reads and interprets invocation rules or mappings from service invocation style 214 and service invocation format 216 of service mapping 204*a*.

Based on the transformation information, at block 306, (a) the first data is transformed to the second data and (b) the particular web service is invoked to service the request in the manner specified by the web service. For example, broker 104 interprets service mapping 204*a*, which is associated with web service 106*a* from which information was requested. Broker 104 determines that web service 106*a* requires a stock symbol as input, in an RPC stub, encoded according to SOAP. Broker transforms the data sent by application 102*a* in the original call-out request to the stock symbol in the format that web service 106*a* requires, and passes that transformed data as input data to web service 106*a* in an RPC with SOAP encoding, thereby invoking web service 106*a*.

In one embodiment, which embodies the two-way functionality of web service broker 104, the requested information is received by the web service broker 104 from the particular web service that was invoked to service the request and, based on the transformation information, the requested information is transformed to data that the requesting application can use. For example, the data is formatted according to the requirements of application 102*a*, based on transformation information 202. The transformed requested information can then be passed back to application 102*a* in a format that is useful to application 102*a*, or can be deposited or saved to a repository for retrieval by the source application 102*a*. The repository may be shared by multiple source applications and multiple instances of source applications.

B. Requests for Non-Specific Web Services

Figure 4:
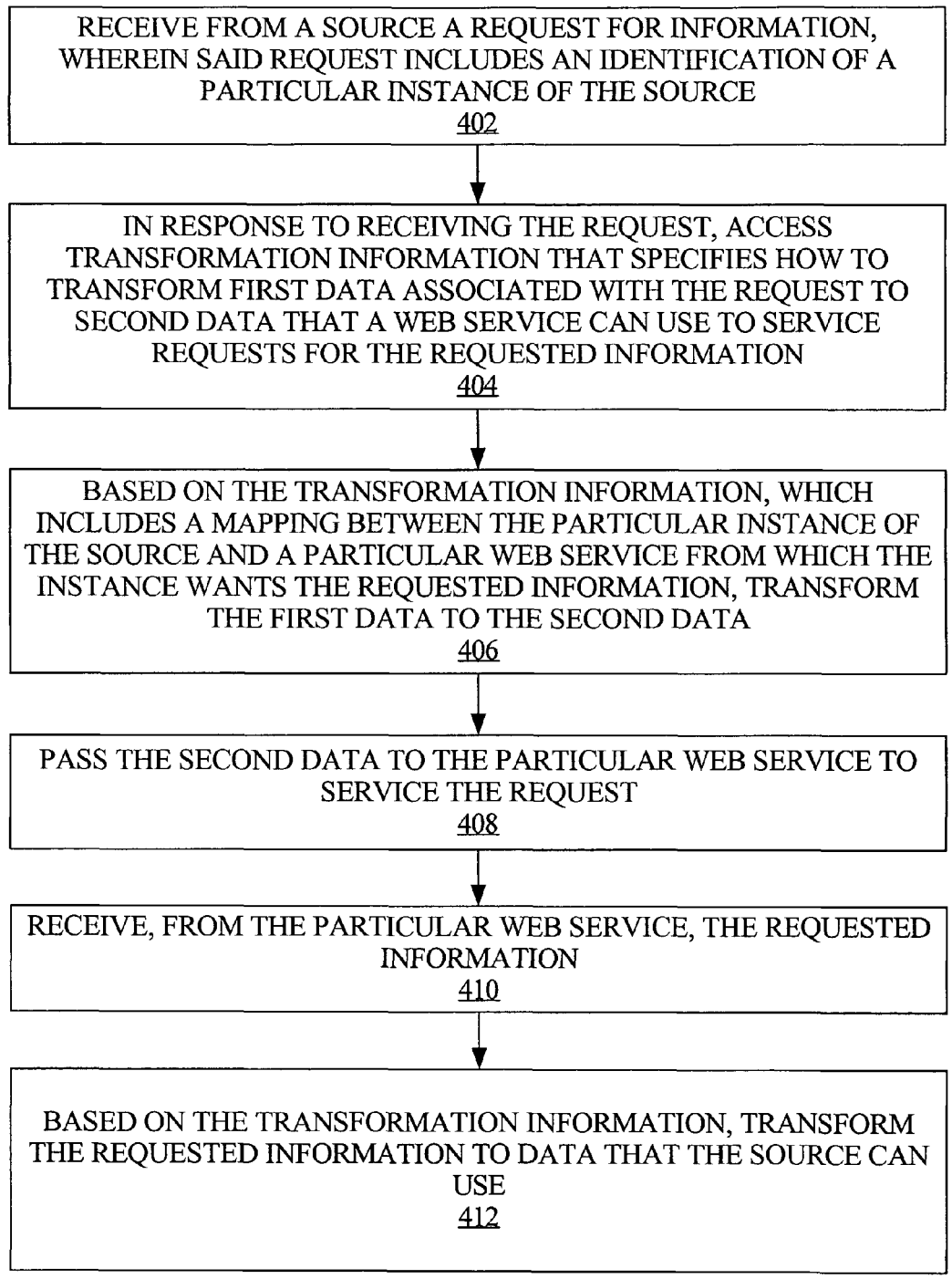
FIG. 4 is a flow diagram that illustrates an automated process for managing requests for web services.
Figure 5:
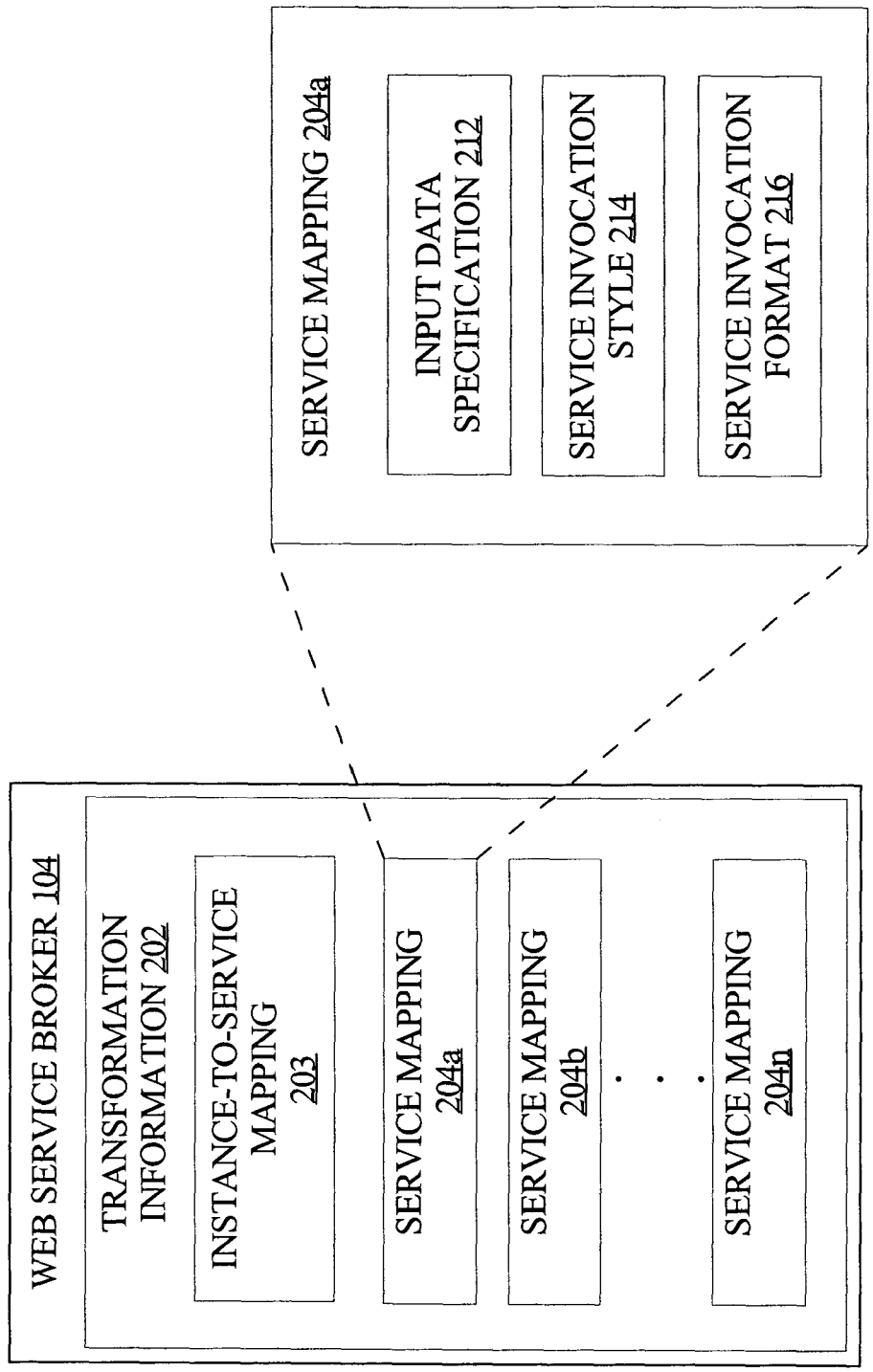
FIG. 5 is a block diagram that illustrates transformation information used by a web service broker.

FIG. 4 is a flow diagram that illustrates an automated process for handling requests for web services. FIG. 5 is a block diagram that illustrates transformation information used by a web service broker, according to one embodiment. The computer-implemented actions associated with the process of FIG. 4 are executed by one or more processors of a computer system, such as computer system 600 of FIG. 6. The instructions that are executed by the processor(s) are part of a computer program, such as the web service broker 104 of FIG. 5.

At block 402, a request for information is received from a source. The request includes information that identifies the particular instance of the source. For example, broker 104 receives a call-out from application 102*b* requesting certain information. With this aspect, the calling application may not have been developed specifically for a particular user. Hence, the calling application makes generic requests. The generic requests are requests for particular information in a general form and manner such that any one of multiple web services that provide the same service or information may be invoked by way of the request, without specification of a particular web service from which to obtain the requested information.

In an embodiment, the request is not completely generic but is "semi-generic" because the request includes at least information that identifies the particular instance or installation of the source. For example, the request may include a serial number that identifies the owner or licensee of the source instance. From identification of the source instance, an instance-to-service mapping 203 (FIG. 5) is used to determine the particular web service to which the request is to be passed, based on the source instance. In this embodiment, the user's preference for one web service over another is honored by mapping the "semi-generic" request to a request that invokes a preferred web service of the owner or licensee. According to this aspect that is illustrated in FIG. 4, the application and associated requests or call-outs are more generally applicable to multiple web services than the requests issued from applications according to the aspect illustrated in FIG. 3 because the particular web service need not be identified in the request.

According to embodiments, the web service from which information is ultimately requested has characteristics that are described in WSDL and published in a UDDI registry. Thus, such web services are what are commonly referred to in the art as "Web Services". In other embodiments, the web service from which information is ultimately requested is, generally, a server-side service function that accepts specific data over a network as input to the function and which returns resulting data over the network to a requesting client-side application. This type of web service is distinct from a simple request for a web page from a web server, e.g., inputting or linking to a URL via a web browser, and performs a computation or function that is more than simply responding to the request with transmission of a web page, e.g., an HTML document rendered via the web browser.

At block 404, in response to the broker 104 receiving the request, transformation information is accessed. The transformation information, such as transformation information 202 (FIG. 2), specifies how to transform first data associated with the request to second data that the particular web service can use to service requests for the requested information. For example, broker 104 reads and interprets transformation rules or mappings from input data specification 212 of service mapping 204*b*. The transformation information further includes a mapping between the particular instance of the source, which is identified in the request from the application, and a particular web service from which the particular instance wants the requested information. For example, broker 104 reads and interprets instance-to-service mapping 203 (FIG. 5) of transformation information 202 to determine which service mapping 204*a*, 204*b*-204*n* to reference to transform and invoke an associated web service preferred by the user, owner or licensee of the source application.

Based on the transformation information, at block 406, the first data is transformed to the second data. For example, broker 104 interprets service mapping 204b, which is associated with web service 106b, which was mapped from the source instance identification in the request via the instance-to-service mapping 203 (FIG. 5). Broker transforms the data sent by application 102b in the original call-out request, to the format that web service 106b requires and according to the access style and encoding format that web service 106b requires. In one embodiment, the transformed data is passed as input data to a web service to invoke the servicing of the request, at block 408.

In one embodiment, the requested information is received by broker 104 from the particular web service that was invoked to service the request, at block 410. Based on transformation information, at block 412 the requested information is transformed to data that the source, or requesting application, can use. For example, the data is formatted according to the requirements of application 102b, based on transformation information 202. The transformed requested information can then be passed back to application 102b in a format that is useful to application 102b.

"Many-To-Many" Brokering

Web service broker 104 can perform data transformations and web service invocations, as described herein, in response to requests from multiple, or "many", applications. Further, broker 104 is capable of performing the transformations and invocations required by multiple, or "many", web services. Thus, a single instance of a broker 104 can broker "many-to-many" transactions and types of transactions between applications and web services. Thus, for any given service, broker 104 can convert requests from many different types of applications. Conversely, for any given application, broker 104 can convert requests from the application to the format required by any number of web services.

Broker 104 can transform data from multiple sources, where the form of the data from at least two of the sources is different. For example, one application may output data parameters in an XML document and another application may output similar data as a Java object. Furthermore, each of the data forms may be included in requests for the same information from the same web service, and the broker 104 performs the necessary data transformations required by the web service. Still further, broker 104 can transform data from a single source to invoke services from different web services. The different web services may perform the same function, e.g., output the same data, and have different data input and invocation requirements.

Hardware Overview

Figure 6:
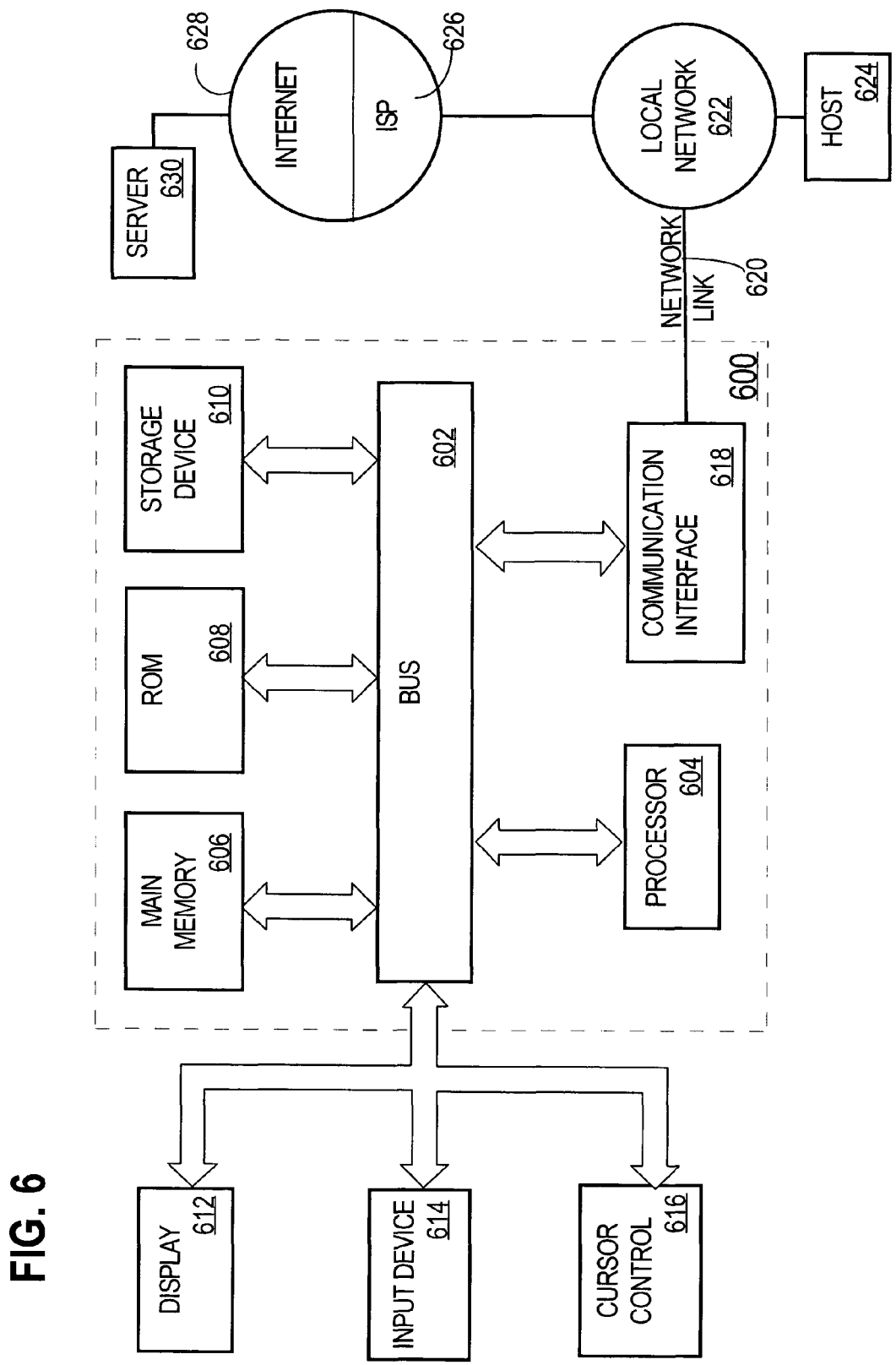
FIG. 6 is a block diagram that illustrates a computer system upon which an embodiment of the invention may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk, optical disk, or magneto-optical disk, is provided and coupled to bus 602 for storing information and instructions.

Computer system 600 may be coupled via bus 602 to a display 612, such as a cathode ray tube (CRT) or a liquid crystal display (LCD), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical, magnetic, or magneto-optical disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

Extensions and Alternatives

Alternative embodiments of the invention are described throughout the foregoing description, and in locations that best facilitate understanding the context of the embodiments. Furthermore, the invention has been described with reference to specific embodiments thereof. It will, however, be evident that various modifications and changes may be made thereto without departing from the broader spirit and scope of the invention.

For example, reference is made to the currently common method of describing and publishing web services using WSDL and UDDI. Furthermore, data, data format, access style and encoding requirements associated with particular web services are referenced to perform techniques described herein. However, as the development and description procedures and standards of web services evolve, the techniques described herein are applicable to other new computer languages, procedures and standards associated with web services that are not currently known. Therefore, the specification and drawings are, accordingly, to be regarded in an illustrative rather than a restrictive sense.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

What is claimed is:

1. A method for handling requests for web services, the method comprising the computer-implemented steps of:

receiving at a web services broker, from a particular instance of a client application, a request for information, wherein said request includes an identification of a particular web service from which said particular instance wants said requested information, the request having first input data, the first input data being in a form that cannot be used by said particular web service to service requests for said information at least in part because said first input data does not include any value for a first parameter required by the particular web service;

in response to receiving said request, the web services broker accessing, based on said identification of said particular web service, transformation information that specifies, how to provide, from said first input data associated with said request, second input data that said particular web service can use to service requests for said requested information, and how to invoke said particular web service in a manner required by said particular web service, to obtain said requested information from said particular web service;

providing said second input data from said first input data, wherein providing the second input data includes supplementing the first input data with a first value for said first parameter required by the particular web service; and invoking, in said manner required by said particular web service, said particular web service to obtain said requested information from said particular web service;

wherein said requested information is obtained from said particular web service by providing the first value to the particular web service as a value for said first parameter;

wherein the method is performed by one or more computing devices.

2. The method of claim 1, further comprising the steps of:

receiving, from said particular web service, said requested information; and transforming, based on said transformation information, said requested information to data that said client application can use.

3. The method of claim 1, wherein said transformation information includes a mapping of first input data from a first particular client application to second input data that a first web service can use, and a mapping of first input data from a second particular client application to said second input data that said first web service can use, and wherein said first input data from said first particular client application has a different form than said first input data from said second particular client application.

4. The method of claim 1, wherein said transformation information includes a mapping of first input data from a first client application to second input data that a first web service can use and to second input data that a second web service can use, and wherein said first web service is different than said second web service.

5. The method of claim 1, further comprising the computer-implemented steps of:

based on said transformation information, determining whether to use RPC style of communication or messaging style of communication to invoke said particular web service.

6. The method of claim 1, further comprising the computer-implemented steps of:
   based on said transformation information, determining whether to use SOAP encoding to encode a communication for invoking said particular web service.

7. A method for handling requests for web services, the method comprising the computer-implemented steps of:
   receiving at a web services broker, from a particular instance of a client application, a request for information, wherein said request includes an identification of a particular instance of said client application, the request having first input data, the first input data being in a form that cannot be used by a particular web service to service requests for said information at least in part because said first input data does not include any value for a first parameter required by the particular web service;
   in response to receiving said request, based on said identification of said particular instance of said client application, the web services broker accessing transformation information;
   wherein said transformation information includes a mapping between said identification of said particular instance of said client application and an identification of said particular web service, the mapping indicating that said particular instance prefers said particular web service to service requests from said particular instance for said requested information;
   wherein said transformation information specifies how to provide, from said first input data associated with said request, second input data that said particular web service can use to service requests for said requested information, and how to invoke said particular web service in a manner required by said particular web service, to obtain said requested information from said particular web service;
   based on said transformation information, the web services broker providing said second input data from said first input data, wherein providing the second input data includes supplementing the first input data with a first value for said first parameter required by the particular web service;
   the web services broker invoking, in said manner required by said particular web service, said particular web service to obtain said requested information from said particular web service;
   wherein said requested information is obtained from said particular web service by the web services broker providing the first value to the particular web service as a value for said first parameter;
   wherein the method is performed by one or more computing devices.

8. The method of claim 7, wherein said identification of a particular instance of said client application includes identification of a user of said client application.

9. The method of claim 7, further comprising the computer-implemented step of:
   passing said second input data as input to said particular web service to service said request.

10. The method of claim 9,
    wherein said transformation information specifies a mapping between said first input data output from said client application and data that said particular web service can use as input to determine said requested information; and
    wherein said step of passing includes passing said second input data, according to said transformation information, as input to said particular web service to determine said requested information.

11. The method of claim 10,
    wherein said transformation information specifies a first manner in which said particular web service can be invoked to service requests for said requested information; and
    wherein said step of passing includes passing said second input data in said first manner, to invoke said particular web service to determine said requested information.

12. The method of claim 11,
    wherein said transformation information specifies a second manner in which said second input data is characterized so that said particular web service can be invoked to service requests for said requested information; and
    wherein said step of passing includes passing, according to said first manner, said second input data that is characterized according to said second manner, to invoke said particular web service to determine said requested information.

13. The method of claim 12, wherein said second manner includes characterizing said second input data according to Simple Object Access Protocol.

14. The method of claim 9,
    wherein said transformation information specifies a first manner in which said particular web service can be invoked to service requests for said requested information and a second manner in which said second input data is characterized in an invocation of said particular web service; and
    wherein said step of passing includes passing, according to said first manner, said second input data that is characterized according to said second manner, to invoke said particular web service to determine said requested information.

15. The method of claim 7, wherein said particular web service has characteristics that are described in Web Service Description Language.

16. The method of claim 15, wherein said particular web service has characteristics that are published in a Universal Description, Discovery, and Integration registry.

17. The method of claim 7, further comprising the steps of:
    receiving, from said particular web service, said requested information; and
    transforming, based on said transformation information, said requested information to data that said client application can use.

18. The method of claim 7, wherein said transformation information specifies how to transform a plurality of first input data each from a respective client application of a plurality of client applications, to a plurality of second input data each for a respective web service of a plurality of web services.

19. The method of claim 7, wherein said transformation information includes a mapping of first input data from a first particular client application to second input data that a first web service can use, and a mapping of first input data from a second particular client application to said second input data that said first web service can use, and wherein said first input data from said first particular client application has a different form than said first input data from said second particular client application.

20. The method of claim 7, wherein said transformation information includes a mapping of first input data from a first client application to second input data that a first web service can use and to second input data that a second web service can use, and wherein said first web service is different than said second web service.

21. The method of claim 20, wherein said first web service and said second web service can determine the same requested information, and wherein said second input data that said first web service can use is different from said second input data that said second web service can use.

22. A system for handling requests for web services, the system comprising:
  means for receiving at a web services broker, from a particular instance of a client application, a request for information from a particular web service, wherein said request includes an identification of a particular web service from which said particular instance wants said requested information, the request having first input data, the first input data being in a form that cannot be used by said particular web service to service requests for said information at least in part because said first input data does not include any value for a first parameter required by the particular web service;
  means for the web services broker accessing, in response to receiving said request, based on said identification of said particular web service, transformation information that specifies
    how to provide, from said first input data associated with said request, second input data that said particular web service can use to service requests for said requested information, and
    how to invoke said particular web service in a manner required by said particular web service, to obtain said requested information from said particular web service;
  means for the web services broker providing, in response to receiving said request, based on said transformation information, said second input data from said first input data, wherein the means for providing the second input data includes means for supplementing the first input data with a first value for said first parameter required by the particular web service;
  means for the web services broker invoking, in response to receiving said request, based on said transformation information, said particular web service in said manner required by said particular web service to obtain said requested information;
  wherein the means for the web services broker invoking includes means for obtaining said requested information from said particular web service by providing the first value to the particular web service as a value for said first parameter.

23. A system for handling requests for web services, the system comprising:
  means for receiving at a web services broker, from a particular instance of said client application, a request for information, wherein said request includes an identification of a particular instance of said client application, the request having first input data, the first input data being in a form that cannot be used by a particular web service to service requests for said information at least in part because said first input data does not include any value for a first parameter required by the particular web service;
  means for the web services broker accessing transformation information in response to receiving said request and based on said identification of said particular instance of said client application;
  wherein said transformation information includes a mapping between said identification of said particular instance of said client application and an identification of said particular web service, the mapping indicating that said particular instance prefers said particular web service to service requests from said particular instance for said requested information;
  wherein said transformation information specifies how to provide, from said first input data associated with said request, second input data that said particular web service can use to service requests for said requested information, and how to invoke said particular web service in a manner required by said particular web service, to obtain said requested information from said particular web service;
  means for the web services broker providing said second input data from said first input data based on said transformation information, wherein the means for providing the second input data includes means for supplementing the first input data with a first value for said first parameter required by the particular web service;
  means for the web services broker invoking, in response to receiving said request, based on said transformation information, said particular web service in said manner required by said particular web service to obtain said requested information;
  wherein the means for the web services broker invoking includes means for obtaining said requested information from said particular web service by providing the first value to the particular web service as a value for said first parameter.

24. The method of claim 1,
  wherein the first input data includes a second value that corresponds to a second parameter required by the particular web service;
  wherein providing said second input data includes changing said second value, based on said transformation information, to create a changed value, wherein changing said second value includes performing a lookup operation, based on said second value, to identify the changed value; and
  wherein said requested information is obtained from said particular web service by providing the changed value to the particular web service as a value for said second parameter.

25. The method of claim 1, wherein said transformation information specifies how to transform a plurality of first data each from a respective source of a plurality of sources, to a plurality of second data each for a respective web service of a plurality of web services.

26. A non-transitory computer-readable medium storing instructions for handling requests for web services, the instructions, when executed by one or more computing devices, cause the one or more computing devices to perform the computer-implemented steps of:
  receiving at a web services broker, from a particular instance of a client application, a request for information, wherein said request includes an identification of a particular web service from which said particular instance wants said requested information, the request having first input data, the first input data being in a form that cannot be used by said particular web service to service requests for said information at least in part because said first input data does not include any value for a first parameter required by the particular web service;

in response to receiving said request, the web services broker accessing, based on said identification of said particular web service, transformation information that specifies, how to provide, from said first input data associated with said request, second input data that said particular web service can use to service requests for said requested information, and how to invoke said particular web service in a manner required by said particular web service, to obtain said requested information from said particular web service;

providing said second input data from said first input data, wherein providing the second input data includes supplementing the first input data with a first value for said first parameter required by the particular web service; and invoking, in said manner required by said particular web service, said particular web service to obtain said requested information from said particular web service;

wherein said requested information is obtained from said particular web service by providing the first value to the particular web service as a value for said first parameter.

27. The non-transitory computer-readable medium of claim 26, further comprising instructions which, when executed by the one or more computing devices, cause the one or more computing devices to perform the steps of:

receiving, from said particular web service, said requested information; and transforming, based on said transformation information, said requested information to data that said client application can use.

28. The non-transitory computer-readable medium of claim 26, wherein said transformation information includes a mapping of first input data from a first particular client application to second input data that a first web service can use, and a mapping of first input data from a second particular client application to said second input data that said first web service can use, and wherein said first input data from said first particular client application has a different form than said first input data from said second particular client application.

29. The non-transitory computer-readable medium of claim 26, wherein said transformation information includes a mapping of first input data from a first client application to second input data that a first web service can use and to second input data that a second web service can use, and wherein said first web service is different than said second web service.

30. The non-transitory computer-readable medium of claim 26, further comprising instructions which, when executed by the one or more computing devices, cause the one or more computing devices to perform the computer-implemented steps of:

based on said transformation information, determining whether to use RPC style of communication or messaging style of communication to invoke said particular web service.

31. The non-transitory computer-readable medium of claim 26, further comprising instructions which, when executed by the one or more computing devices, cause the one or more computing devices to perform the computer-implemented steps of:

based on said transformation information, determining whether to use SOAP encoding to encode a communication for invoking said particular web service.

32. A non-transitory computer-readable medium storing instructions for handling requests for web services, the instructions, when executed by one or more computing devices, cause the one or more computing devices to perform the computer-implemented steps of:

receiving at a web services broker, from a particular instance of a client application, a request for information, wherein said request includes an identification of a particular instance of said client application, the request having first input data, the first input data being in a form that cannot be used by a particular web service to service requests for said information at least in part because said first input data does not include any value for a first parameter required by the particular web service;

in response to receiving said request, based on said identification of said particular instance of said client application, the web services broker accessing transformation information;

wherein said transformation information includes a mapping between said identification of said particular instance of said client application and an identification of said particular web service, the mapping indicating that said particular instance prefers said particular web service to service requests from said particular instance for said requested information;

wherein said transformation information specifies how to provide, from said first input data associated with said request, second input data that said particular web service can use to service requests for said requested information, and how to invoke said particular web service in a manner required by said particular web service, to obtain said requested information from said particular web service;

based on said transformation information, the web services broker providing said second input data from said first input data, wherein providing the second input data includes supplementing the first input data with a first value for said first parameter required by the particular web service;

the web services broker invoking, in said manner required by said particular web service, said particular web service to obtain said requested information from said particular web service;

wherein said requested information is obtained from said particular web service by the web services broker providing the first value to the particular web service as a value for said first parameter.

33. The non-transitory computer-readable medium of claim 32, wherein said identification of a particular instance of said client application includes identification of a user of said client application.

34. The non-transitory computer-readable medium of claim 32, further comprising instructions which, when executed by the one or more computing devices, cause the one or more computing devices to perform the computer-implemented step of:

passing said second input data as input to said particular web service to service said request.

35. The non-transitory computer-readable medium of claim 34, wherein said transformation information specifies a mapping between said first input data output from said client application and data that said particular web service can use as input to determine said requested information; and wherein said step of passing includes passing said second input data, according to said transformation information, as input to said particular web service to determine said requested information.

36. The non-transitory computer-readable medium of claim 35,
  wherein said transformation information specifies a first manner in which said particular web service can be invoked to service requests for said requested information; and
  wherein said step of passing includes passing said second input data in said first manner, to invoke said particular web service to determine said requested information.

37. The non-transitory computer-readable medium of claim 36,
  wherein said transformation information specifies a second manner in which said second input data is characterized so that said particular web service can be invoked to service requests for said requested information; and
  wherein said step of passing includes passing, according to said first manner, said second input data that is characterized according to said second manner, to invoke said particular web service to determine said requested information.

38. The non-transitory computer-readable medium of claim 37, wherein said second manner includes characterizing said second input data according to Simple Object Access Protocol.

39. The non-transitory computer-readable medium of claim 34,
  wherein said transformation information specifies a first manner in which said particular web service can be invoked to service requests for said requested information and a second manner in which said second input data is characterized in an invocation of said particular web service; and
  wherein said step of passing includes passing, according to said first manner, said second input data that is characterized according to said second manner, to invoke said particular web service to determine said requested information.

40. The non-transitory computer-readable medium of claim 32, wherein said particular web service has characteristics that are described in Web Service Description Language.

41. The non-transitory computer-readable medium of claim 40, wherein said particular web service has characteristics that are published in a Universal Description, Discovery, and Integration registry.

42. The non-transitory computer-readable medium of claim 32, further comprising instructions which, when executed by the one or more computing devices, cause the one or more computing devices to perform the steps of:
  receiving, from said particular web service, said requested information; and
  transforming, based on said transformation information, said requested information to data that said client application can use.

43. The non-transitory computer-readable medium of claim 32, wherein said transformation information specifies how to transform a plurality of first input data each from a respective client application of a plurality of client applications, to a plurality of second input data each for a respective web service of a plurality of web services.

44. The non-transitory computer-readable medium of claim 32, wherein said transformation information includes a mapping of first input data from a first particular client application to second input data that a first web service can use, and a mapping of first input data from a second particular client application to said second input data that said first web service can use, and wherein said first input data from said first particular client application has a different form than said first input data from said second particular client application.

45. The non-transitory computer-readable medium of claim 32, wherein said transformation information includes a mapping of first input data from a first client application to second input data that a first web service can use and to second input data that a second web service can use, and wherein said first web service is different than said second web service.

46. The non-transitory computer-readable medium of claim 45, wherein said first web service and said second web service can determine the same requested information, and wherein said second input data that said first web service can use is different from said second input data that said second web service can use.

47. The non-transitory computer-readable medium of claim 26,
  wherein the first input data includes a second value that corresponds to a second parameter required by the particular web service;
  wherein providing said second input data includes changing said second value, based on said transformation information, to create a changed value, wherein changing said second value includes performing a lookup operation, based on said second value, to identify the changed value; and
  wherein said requested information is obtained from said particular web service by providing the changed value to the particular web service as a value for said second parameter.

48. The non-transitory computer-readable medium of claim 26, wherein said transformation information specifies how to transform a plurality of first data each from a respective source of a plurality of sources, to a plurality of second data each for a respective web service of a plurality of web services.

49. The system of claim 22,
  wherein the first input data includes a second value that corresponds to a second parameter required by the particular web service;
  wherein the means for providing said second input data includes means for changing said second value, based on said transformation information, to create a changed value, wherein the means for changing said second value includes means for performing a lookup operation, based on said second value, to identify the changed value; and
  wherein said requested information is obtained from said particular web service by providing the changed value to the particular web service as a value for said second parameter.

50. The system of claim 23,
  wherein the first input data includes a second value that corresponds to a second parameter required by the particular web service;
  wherein the means for providing said second input data includes means for changing said second value, based on said transformation information, to create a changed value, wherein the means for changing said second value includes means for performing a lookup operation, based on said second value, to identify the changed value; and
  wherein said requested information is obtained from said particular web service by providing the changed value to the particular web service as a value for said second parameter.

51. The method of claim 7,
wherein the first input data includes a second value that corresponds to a second parameter required by the particular web service;
wherein providing said second input data includes changing said second value, based on said transformation information, to create a changed value, wherein changing said second value includes performing a lookup operation, based on said second value, to identify the changed value; and
wherein said requested information is obtained from said particular web service by providing the changed value to the particular web service as a value for said second parameter.

52. The non-transitory computer-readable medium of claim 32,
wherein the first input data includes a second value that corresponds to a second parameter required by the particular web service;
wherein providing said second input data includes changing said second value, based on said transformation information, to create a changed value, wherein changing said second value includes performing a lookup operation, based on said second value, to identify the changed value; and
wherein said requested information is obtained from said particular web service by providing the changed value to the particular web service as a value for said second parameter.

53. The method of claim 1,
wherein the particular web service serves as the source of said requested information, and is separate from the web services broker; and
wherein the particular instance of said client application is separate from the web services broker.

54. The method of claim 7,
wherein the particular web service serves as the source of said requested information, and is separate from the web services broker; and
wherein the particular instance of said client application is separate from the web services broker.

55. The system of claim 22,
wherein the particular web service serves as the source of said requested information, and is separate from the web services broker; and
wherein the particular instance of said client application is separate from the web services broker.

56. The system of claim 23,
wherein the particular web service serves as the source of said requested information, and is separate from the web services broker; and
wherein the particular instance of said client application is separate from the web services broker.

57. The non-transitory computer-readable medium of claim 26,
wherein the particular web service serves as the source of said requested information, and is separate from the web services broker; and
wherein the particular instance of said client application is separate from the web services broker.

58. The non-transitory computer-readable medium of claim 32,
wherein the particular web service serves as the source of said requested information, and is separate from the web services broker; and
wherein the particular instance of said client application is separate from the web services broker.

* * * * *

UNITED STATES PATENT AND TRADEMARK OFFICE
CERTIFICATE OF CORRECTION

| | | |
|---|---|---|
| PATENT NO. | : 7,797,450 B2 | Page 1 of 1 |
| APPLICATION NO. | : 10/648951 | |
| DATED | : September 14, 2010 | |
| INVENTOR(S) | : Nan Xie et al. | |

It is certified that error appears in the above-identified patent and that said Letters Patent is hereby corrected as shown below:

In column 4, line 21, delete "Operation Environment" and insert -- Operating Environment --, therefor.

Signed and Sealed this
Second Day of August, 2011

David J. Kappos
*Director of the United States Patent and Trademark Office*